United States Patent [19]

Ueno

[11] Patent Number: 4,603,668

[45] Date of Patent: Aug. 5, 1986

[54] APPARATUS FOR CONTROLLING THE ROTATIONAL SPEED OF AN INTERNAL COMBUSTION ENGINE

[75] Inventor: Masahito Ueno, Higashimatsuyama, Japan

[73] Assignee: Diesel Kiki Co., Ltd., Japan

[21] Appl. No.: 606,700

[22] Filed: May 3, 1984

[30] Foreign Application Priority Data

May 4, 1983 [JP] Japan .................................. 58-77571

[51] Int. Cl.[4] .......................... F02D 1/02; F02D 31/00
[52] U.S. Cl. .................................... 123/352; 123/339; 123/357
[58] Field of Search ............... 123/350, 352, 357, 339, 123/353

[56] References Cited

U.S. PATENT DOCUMENTS

| | | | |
|---|---|---|---|
| 4,245,599 | 1/1981 | Des Lauriers | 123/353 |
| 4,307,690 | 12/1981 | Rau et al. | 123/352 X |
| 4,425,888 | 1/1984 | Engel et al. | 123/339 |
| 4,441,471 | 4/1984 | Kratt et al. | 123/340 X |
| 4,474,154 | 10/1984 | Henning et al. | 123/352 X |

*Primary Examiner*—Tony M. Argenbright
*Attorney, Agent, or Firm*—Guy W. Shoup

[57] ABSTRACT

An apparatus for controlling the rotational speed of an internal combustion engine has a circuit for producing a signal corresponding to the difference between the actual engine speed and the target engine speed and a processor for weighting this signal by a factor that continuously changes according to the magnitude of the difference. The weighted signal is converted to a control signal for adjusting the speed of the engine.

4 Claims, 3 Drawing Figures

1

APPARATUS FOR CONTROLLING THE ROTATIONAL SPEED OF AN INTERNAL COMBUSTION ENGINE

BACKGROUND OF THE INVENTION

The present invention relates to an apparatus for controlling the rotational speed of an internal combustion engine, more particularly to an apparatus for controlling the engine speed to that suitable for auto-cruising.

For maintaining the speed of a vehicle at a predetermined level, there has, for example, been used an apparatus in which the fuel supplied to the engine is regulated by a closed control loop to reduce the difference between the actual engine speed and the target engine speed. In such a conventional apparatus, the rate at which said difference is reduced remains constant regardless of the magnitude of the difference. This leads to the disadvantage that correction overshoot is liable to occur when the difference is small and the disadvantage that a long time is needed for converging the actual and target speeds when the difference is large. To eliminate these disadvantages of the conventional device, Japanese Patent Public Disclosure No. 57-110745 proposes an engine speed controlling device wherein the loop gain of the control system is changed stepwisely as the amount of difference changes.

However, an offset condition will occur in this apparatus when the control state is changed from one control region into another. As a result, for example, the response characteristics in the control operation will rapidly vary when the control state shifts from a non-controlled region provided as a neutral zone into a control zone. That is, the control operation will become discontinuous due to the sharp change in the control rate, making it impossible to control the engine speed smoothly.

SUMMARY OF THE INVENTION

It is therefore an object of the present invention to provide an improved apparatus for controlling engine speed in which the loop gain of the control system is varied as a function of the amount of deviation between the target engine speed and the actual engine speed, so as to carry out rapid and smooth control of the engine speed.

It is another object of the present invention to provide an improved apparatus for controlling engine speed, in which no neutral zone is provided, thus precluding any discontinuity in the control operation, and the control loop gain is varied as a function of the amount of deviation, so that smooth and rapid control of the engine speed can be attained while maintaining continuity of the control over the whole of the deviation range.

In the engine speed control apparatus of the present invention, the engine speed is controlled by the use of a closed loop on the basis of the deviation of the actual engine speed from the target engine speed and the control gain of the closed loop is varied continuously as a function of the amount of deviation.

For example, the deviation $\Delta V$ between the target and actual speeds may be used for PID (Proportional, Integrational and Differential) control as it is when $|\Delta V|$ is not more than a predetermined value $V_1$, while a weighted value obtained by multiplying $|\Delta V|^2$ by a predetermined constant K may be used therefor when $|\Delta V|$ is more than $V_1$. This will make continuous control possible if the values of $V_1$ and K are properly selected.

According to the present invention, since the deviation between the target engine speed and the actual engine speed is weighted when the deviation exceeds a predetermined value and PID control is carried out over the whole deviation range without establishing a neutral zone, no offset condition of the control arises and the control of the engine speed can be continuously attained with highly responsive characteristics. As a result, the engine speed can be rapidly and smoothly converged to the target value without impairing the continuity of the control.

The invention will be better understood and the other objects and advantages thereof will be more apparent from the following detailed description of a preferred embodiment with reference to the accompanying drawings.

DESCRIPTION OF THE PREFERRED EMBODIMENTS

Figure 1:
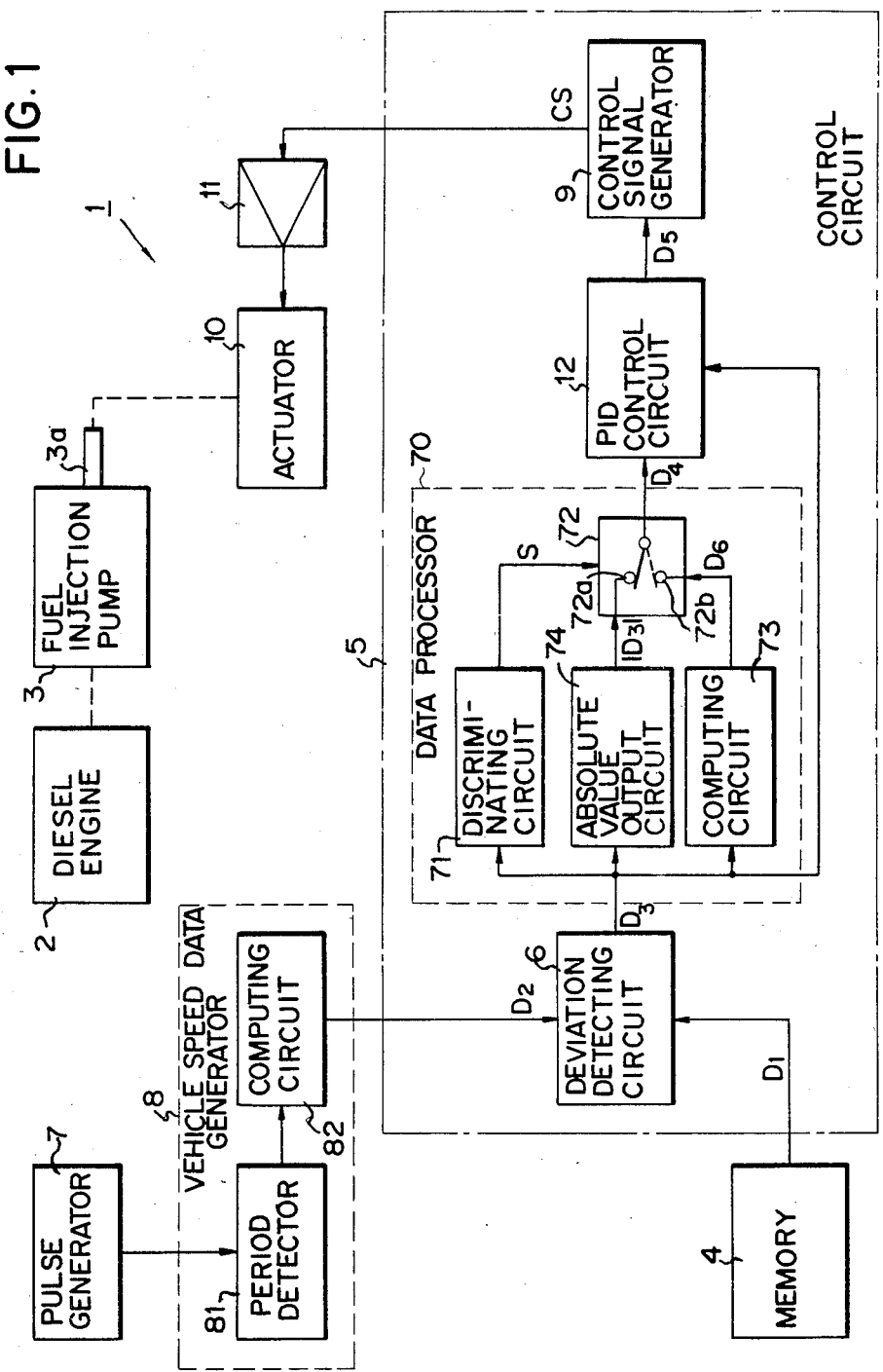
FIG. 1 is a block diagram of an embodiment of the apparatus for controlling the rotational speed of an internal combustion engine according to the present invention.

FIG. 1 shows a vehicle speed control apparatus employing an engine speed control apparatus according to the present invention. The vehicle speed control apparatus 1 controls the speed of a diesel engine 2 so as to maintain the speed of the vehicle (not shown) driven by the diesel engine 2 at a target vehicle speed. The apparatus 1 has a control loop which controls the position of a control rack 3a for adjusting the amount of fuel supplied from a fuel injection pump 3 to the diesel engine 2 in accordance with the amount of deviation of the actual vehicle speed from the target vehicle speed to maintain the actual speed at the target speed.

Data indicating the target vehicle speed is stored in a memory 4 and a first data $D_1$ indicative of the target vehicle speed read out from the memory 4 is applied to one input terminal of a deviation detecting circuit 6 of a control circuit 5. For detection of the actual vehicle speed at each instant, there is provided a pulse generator 7 for generating a pulse train signal P whose period varies in accordance with the vehicle speed and the pulse train signal P is applied to a vehicle speed data generator 8. The vehicle speed data generator 8 has a period detector 81 for detecting the period of the pulse train signal P and a computing circuit 82 for computing and producing a second data $D_2$ indicative of the vehicle speed in response to the output from the period detector 81. The second data $D_2$ is applied to another input terminal of the deviation detecting circuit 6 to produce a third data $D_3$ representing the deviation of the actual vehicle speed from the target vehicle speed.

For changing the gain of the control loop so as to continuously carry out the vehicle speed control at an appropriate response speed, the control circuit 5 has a data processor 70 in which the third data $D_3$ is weighted as described hereinafter to produce output data $D_4$.

To enable proportional, integrational and differential control on the basis of the output data $D_4$, the output data $D_4$ is processed in a PID control circuit 12 and the data $D_4$ processed by the PID control circuit 12 is applied to a control signal generator 9 as PID control data $D_5$. Then, a control signal CS for controlling and driving an actuator 10 connected to the control rack $3a$ is produced on the basis of the data $D_5$. The control rack $3a$ is driven in response to the control signal CS applied to the actuator 10 through an amplifier 11 in such a way that the actual vehicle speed is converged with the target vehicle speed. Thus, the vehicle speed is controlled so as to be maintained at the target vehicle speed indicated by the first data $D_1$ from the memory 4.

The data processor 70 has a discriminating circuit 71 in which the absolute value $|\Delta V|$ of the deviation shown by third data $D_3$ is compared with a predetermined value $V_1$. The discriminating circuit 71 produces a discrimination signal S whose level becomes a predetermined low level when $|\Delta V| \leq V_1$ and becomes a predetermined high level when $|\Delta V| > V_1$. The discrimination signal S is applied to a switch 72 which is switched over to one state shown by a solid line when the level of the discrimination signal S is low and switched over to the other state shown by a broken line when the level of the signal S is high.

The data processor 70 further comprises a computing circuit 73 responsive to the third data $D_3$ for computing the value $K \cdot |\Delta V|^2$ and an absolute value output circuit 74 responsive to the third data $D_3$ for producing data $|D_3|$ showing the absolute value of the deviation shown by the data $D_3$.

The data $|D_3|$ is applied to one fixed contact $72a$ of the switch 72 and data $D_6$ showing the computed result in the computing circuit 73 is applied to another fixed contact $72b$ of the switch 72. Therefore, the data $|D_3|$ is derived as the data $D_4$ when $|\Delta V| \leq V_1$, while the data $D_6$ is derived as the data $D_4$ when $|\Delta V| > V_1$.

Figure 2:
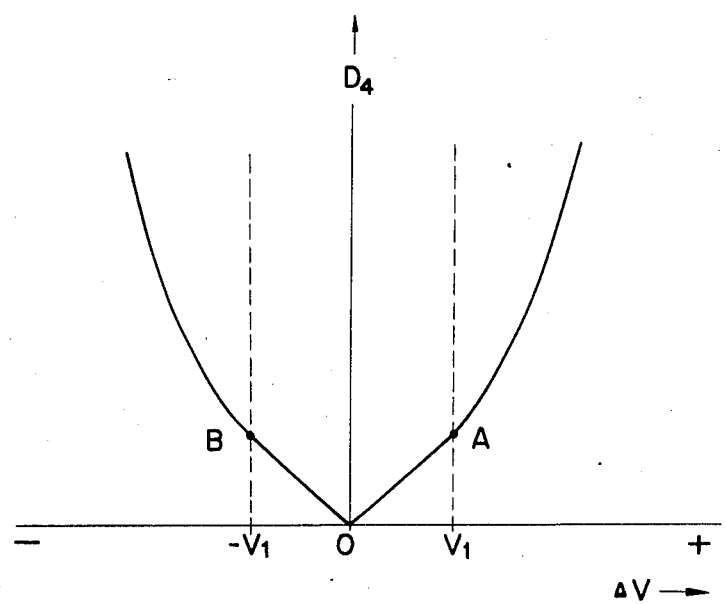
FIG. 2 is a characteristic curve showing the characteristics of the data processor shown in FIG. 1.

FIG. 2 is a graph showing the relationship between the magnitude of the data $D_4$ and the deviation $\Delta V$. As seen from the above description, the magnitude of the data $D_4$ is proportional to the deviation $\Delta V$ when $|\Delta V| \leq V_1$, and the magnitude of the data $D_4$ rapidly increases with increasing deviation $\Delta V$ when $\Delta V > V_1$. It is possible to prevent any discontinuity of the control characteristics shown in FIG. 2 at points A and B and to obtain continuous control characteristics when the boundary values $+V_1$ and $-V_1$ and the value of the constant K are properly selected. Thus, the speed control can be carried out stably even if the deviation $\Delta V$ is at or adjacent to the points A or B.

To provide the PID control circuit 12 with information on whether or not the sign of the deviation $\Delta V$ is positive, the data $D_3$ is applied to the PID control circuit 12.

With this circuit arrangement, the value shown by the data $D_4$ is equal to $|\Delta V|$ when the absolute value $|\Delta V|$ of the deviation is not more than $V_1$. However, when the absolute value $|\Delta V|$ is not more than $V_1$, since the data obtained by weighting the data $D_3$ in the computing circuit 73 is derived as the data $D_4$ and $D_4$ is equal to $K \cdot |\Delta V|^2$, the apparent deviation shown by data $D_4$ becomes larger.

This means that as the deviation $\Delta V$ becomes larger, the gain of the closed control loop becomes larger, so that the control speed of the control loop increases as the deviation $\Delta V$ increases. Consequently, the vehicle speed can be quickly converged with the target vehicle speed. That is, it is possible to reduce the time required for the vehicle speed to stabilize.

As will be seen from FIG. 2 no neutral zone is established by this control loop, so that there is of course no corresponding discontinuity in the control. Furthermore, the control can be carried out continuously over the whole of the control range.

In the embodiment described above, the characteristic curve shown in FIG. 2 is only an example, and the present invention is not limited to the apparatus with this characteristic curve. For example, the control region may be divided into three or more sections depending on the magnitude of deviation $\Delta V$. Moreover, instead of the computing circuit 73, or in addition to the computing circuit 73, a circuit for raising $\Delta V$ to the third, fourth or higher power may be employed, so that the gain of the control loop is continuously increased as the absolute value of the deviation increases.

Also, although the characteristic curve shown in FIG. 2 is symmetrical with respect to the ordinate, it is possible to set the values of $+V_1$ and $-V_1$ so that the characteristic changeover points A and B as well as the characteristic curve as a whole become asymmetrical with respect to the ordinate.

Figure 3:
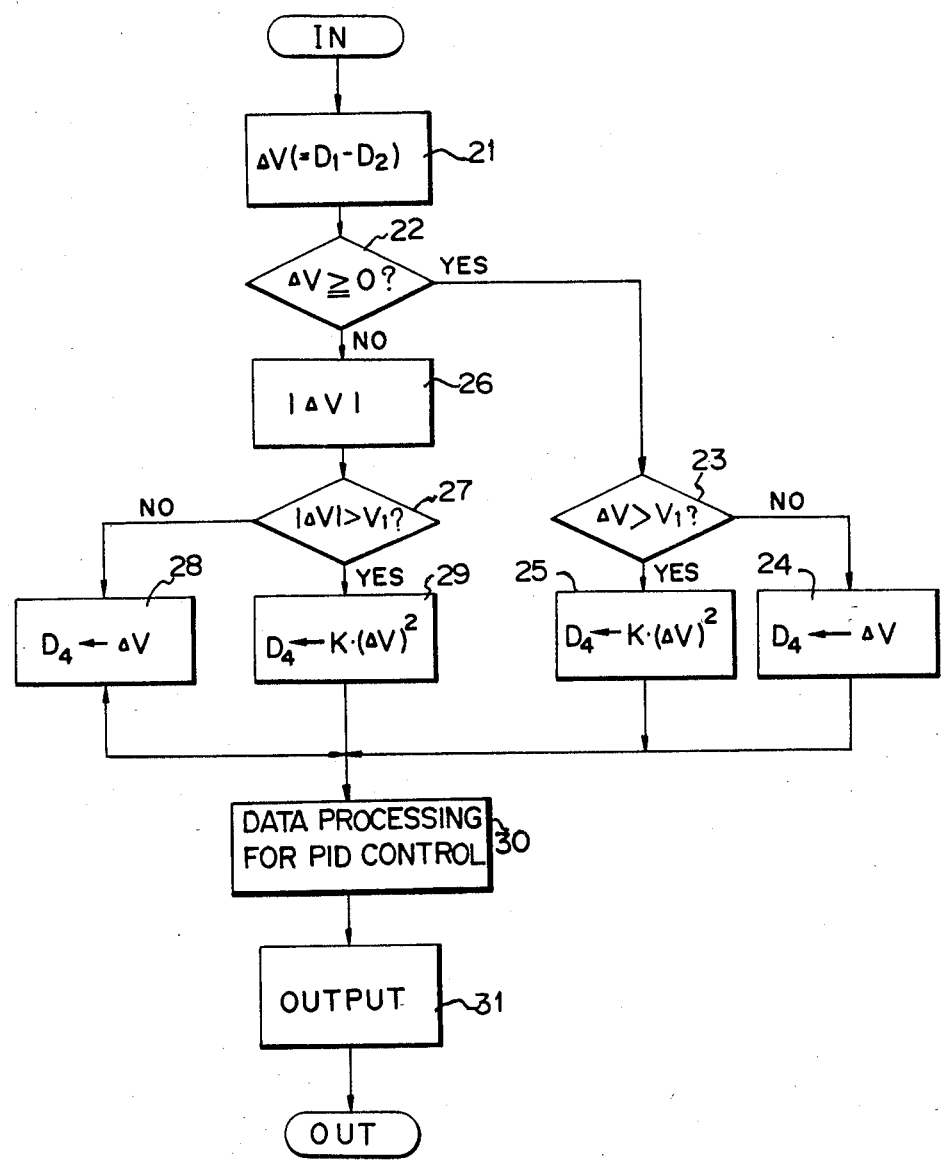
FIG. 3 is a flow chart of a control program used when the control unit shown in FIG. 1 is replaced by a microcomputer.

The operations carried out by the control circuit 5 in FIG. 1 can instead be performed by a microcomputer running a program such as that shown, for example, in the flow chart in FIG. 3. This program may, for example, be executed together with the main program for control of the fuel injection pump by a microcomputer built in a main control device (not shown) for electronically controlling the fuel injection pump 3.

At first, the computation $\Delta V$ ($=D_1-D_2$) is carried out on the basis of the data $D_1$ and $D_2$ in step 21, and the sign of $\Delta V$ is discriminated (step 22). When the deviation $\Delta V$ is positive or zero, the deviation $\Delta V$ is compared with $V_1$ in step 23. Data showing the value of $\Delta V$ is output as the data $D_4$ when $\Delta V \leq V_1$, while $K \cdot \Delta V^2$ is computed in step 25 and data showing the result of the computation is output as the data $D_4$ when $\Delta V < V_1$.

On the other hand, when the result of the discrimination in step 22 is "NO", the absolute value $|\Delta V|$ of the deviation $\Delta V$ is computed in step 26, and it is discriminated whether or not $V_1$ is more than $|\Delta V|$ in step 27.

Data showing $\Delta V$ is output as the data $D_4$ in step 28 when $|\Delta V| \leq V_1$ whereas when $|\Delta V| > V_1$, $K \cdot \Delta V^2$ is computed in step 29 and the computed result is output as the data $D_4$. In this case, the value of $V_1$ in step 23 may be different from that in step 27. For example, a value $V_2$ which is greater than value $V_1$ may be employed instead of the value $V_1$ in step 23.

When the value of the data $D_4$ is set as described above, step 30 is executed, data processing for PID control is effected on data $D_4$ and the control variable is computed in step 31.

Although in the embodiment described above, the present invention is described as applied to a vehicle speed control apparatus, it is also applicable to an engine idling speed control apparatus and other engine speed control apparatuses. Moreover, it can be applied to any kind of engine.

I claim:

1. An apparatus for controlling the rotational speed of an internal combustion engine by employing a closed loop, comprising:

a first means for producing first data indicative of a target engine speed;

a second means for producing second data indicative of the actual engine speed at each instant;

a deviation detecting means responsive to said first and second data for detecting the amount of deviation of the actual engine speed from the target engine speed and outputting a deviation signal corresponding to said deviation;

a first computing means for computing the absolute value of the deviation;

a second computing means for computing a predetermined function of N degrees ($N \geq 2$) of the deviation;

means for discriminating the magnitude of the deviation;

a selecting means for selecting either the computed result from the first computing means or the result from the second computing means in response to the result of the discrimination of said discriminating means;

a generating means for generating a control signal in response to the output from said selecting means; and means responsive to the control signal for adjusting a member for adjusting the speed of the internal combustion engine so that the deviation becomes zero.

2. An apparatus as claimed in claim 1, wherein said discriminating means is adapted to discriminate whether or not the absolute value of the deviation is more than a predetermined value, the computed result from said first computing means is selected by said selecting means when the absolute value of the deviation is not more than a predetermined value and the computed result of said second computing means is selected by said selecting means when the absolute value of the deviation is more than the predetermined value.

3. An apparatus as claimed in claim 1, wherein signal processing for PID control is effected on the output from said selecting means by said generating means in response to a signal indicative of the deviation and the processed output from said selecting means.

4. An apparatus as claimed in claim 1, wherein signal processing for PID control is effected on the output from said selecting means by said generating means in response to a signal indicative of the deviation and the processed output from said selecting means.

* * * * *